Patented Jan. 20, 1953

2,626,268

UNITED STATES PATENT OFFICE 2,626,268

SYNTHESIS OF ALIPHATIC SILANES

Arthur John Barry, Midland, Lee De Pree, Holland, and Donald Eugene Hook, Midland, Mich., assignors to The Dow Chemical Company, Midland, Mich., a corporation of Delaware No Drawing. Application December 11, 1948, Serial No. 64,903

10 Claims. (Cl. 260—448.2)

This invention relates to a method of making organo-silicon compounds and to certain new compounds made by the method. It is particularly concerned with the preparation of organohalosilanes having more than one hydrocarbon radical attached to the silicon atom in the molecule.

The present application is in part a continuation of our U. S. patent application Serial No. 674,926, filed June 6, 1946, now Patent No. 2,510,853.

We have found that an organohalosilane which contains at least one hydrogen and one halogen attached to the silicon atom, e. g. a mono-alkyl dihalosilane, may be caused to react with an olefin to produce a poly-organohalosilane. The reaction is one of addition and by-products usually are not formed to an appreciable extent.

The reaction involved may be illustrated by the equation:

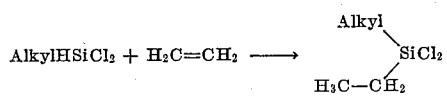

The reaction may be carried out over a range of temperature of from 200° C. to 410° C. In general, temperatures of from 200° to 300° C. are most satisfactory. The rate and efficiency of the reaction are dependent to a large extent upon the proximity of the molecules to be reacted. For this reason the reaction is ordinarily carried out in a closed system at a pressure above 100 pounds per square inch, and usually in the order of from 200 to 2500 pounds per square inch or higher. Employment of a pressure sufficient to liquefy a portion of the reaction mixture results in rapid reaction at a lower temperature than when the mixture is entirely in the vapor phase. The pressure may be developed autogenously within a system or may be superimposed by means of a pump or by developement of a hydrostatic pressure.

Organohalosilanes which may be employed as reactants are compounds of silicon containing both halogen and hydrogen atoms attached directly to the silicon atom, the remaining valences of the silicon being satisfied by hydrocarbon radicals. Suitable organohalosilane starting materials include phenyl dibromosilane, $C_6H_5SiHBr_2$, ethyl methyl chlorosilane, $CH_3(C_2H_5)SiHCl$, propyl dichlorosilane, $C_3H_7SiHCl_2$, methyl dichlorosilane, $CH_3SiHCl_2$, octadecyl dischlorosilane, $C_{18}H_{37}SiHCl_2$, ethyl dibromosilane, $C_2H_5SiHBr_2$, p-methylphenyl dichlorosilane, $C_7H_7SiHCl_2$, etc. Thus, these compounds are of the general formula $R_nHSiX_{3-n}$ in which R represents alkyl or phenyl, n is an integer from 1 to 2 inclusive, and X is a halogen atom, preferably chlorine or bromine.

Examples of satisfactory olefins include ethylene, propylene, butene, pentene, hexene, octene, decene, tetradecene, octadecene, cylohexene, styrene, butadiene, hexadiene, unvulcanized rubber, etc.

Commercial grades of the starting materials may be employed, but impurities present in reactants of technical quality sometimes take part in side reactions which consume a portion of the organohalosilane with resultant reduction in the yield of the desired product. Because of the fact that the reaction products are hydrolyzable, it is important that the reaction be carried out under substantially anhydrous conditions. The absence of oxygen is also desirable.

The preferred mode of practicing the invention involves heating a mixture of the hydrocarbon reactant and an organohalosilane in a suitable reaction vessel, e. g. a bomb or autoclave. Usually from 0.5 to 3.0 molar equivalents of organohalosilane are employed for each molar equivalent of hydrocarbon material, although much greater or smaller proportions may be used. It is sometimes advantageous to employ a solvent, e. g. a saturated fraction of petroleum, which is substantially inert under the reaction conditions to insure mutual solution of the starting materials. Once initiated, the reaction proceeds rapidly until one of the components is substantially exhausted, as indicated by a reduction in pressure. Thereafter, the reaction products and any unreacted materials are withdrawn from the reactor and purified, e. g. by fractional distillation. Unreacted components may be returned to stock for further processing. The process may also be carried out in continuous manner, e. g. by passing a stream of the reaction mixture under pressure through a heated tubular autoclave.

The process, as just described, has been applied in preparing a variety of previously known diorganohalosilanes more conveniently than has heretofore been possible. It has also been applied in making new diorganohalosilanes having the general formula:

wherein R represents a lower alkyl radical containing less than 5 carbon atoms, R' represents a higher alkyl radical containing at least 8 carbon atoms, and X represents a halogen, e. g. chlorine or bromine. When applied to hydrophilic solids, the new compounds modify surfaces of the solids to render them more permanently repellent to water than when treated in like manner with the di-(lower alkyl) dihalosilanes previously known.

The following examples illustrate certain ways in which the principle of the invention has been applied, but are not to be construed as limiting the invention:

Example 1

Approximately 115 grams of methyl dichlorosilane, $CH_3SiHCl_2$, and 29 grams of ethylene were charged into a bomb of 500 milliliters capacity. The bomb was heated externally, while being rotated, and in a period of about one hour was brought to a temperature of approximately 300° C. as measured by a thermocouple in a thermocouple well. The pressure maximum attained within the system was 1600 pounds per square inch. At the end of 16.5 hours, the bomb was cooled and vented through condensers. The condensate was subsequently fractionally distilled. As a fraction distilling at approximately 100° C., at 744 millimeters absolute pressure, there was obtained methyl ethyl dichlorosilane. The product was a colorless liquid having a specific gravity, $d_{20}^{20}$, of 1.067

Unreacted methyl dichlorosilane was also recovered.

Example 2

Approximately 200 grams of a mixture of 80 parts by weight of phenyl dichlorosilane, $C_6H_5SiHCl_2$ in 20 parts of diethylbenzene, and 32 grams of ethylene was reacted in a bomb and the product collected and purified as in Example 1. As a fraction distilling at from 134° to 135.5° C. at 50 millimeters absolute pressure, there was obtained phenyl ethyl dichlorosilane, $C_6H_5(C_2H_5)SiCl_2$.

Example 3

A mixture comprising 0.45 gram molecular weight of phenyl dichlorosilane in diethylbenzene and 0.55 gram mol of propylene was reacted by heating in a bomb at approximately 300° C. for 18 hours. The product was collected and purified as in the preceding examples. As a fraction distilling at from 140° to 144° C. at from 44 to 47 millimeters absolute pressure, there was obtained phenyl propyl dichlorosilane, $C_6H_5(C_3H_7)SiCl_2$. The latter is a colorless liquid having a specific gravity, $d_{20}^{20}$, of 1.08

Example 4

An equimolecular mixture of propylene and methyl dichlorosilane was heated in a bomb for 16 hours at approximately 300° C. Thereafter, the products were collected and purified as in the preceding examples. As a fraction distilling at from 123° to 124° C. at 747 millimeters absolute pressure, there was obtained methyl propyl dichlorosilane, $CH_3(C_3H_7)SiCl_2$, in 72 per cent of theoretical yield. Unreacted methyl dichlorosilane was also recovered.

Example 5

A mixture consisting of 1 gram mol of methyl phenyl chlorosilane, $CH_3(C_6H_5)SiHCl$, and 1 gram mol of propylene was reacted by heating in a bomb of 500 milliliters capacity, at a temperature of from 293° to 314° C. After completing the reaction, the products were separated as in the preceding examples. As a fraction distilling at from 124° to 126° C. at 30 millimeters absolute pressure, there was obtained methyl phenyl propyl chlorosilane, $CH_3(C_3H_7)C_6H_5SiCl$. It is a colorless liquid having a specific gravity, $d_{20}^{20}$, of 1.004

Example 6

By procedure similar to that described in preceding examples, 3 gram mols of octene and 3 gram mols of methyl dichlorosilane were reacted and the products collected and subsequently fractionally distilled.

As the major reaction product, there was obtained methyl n-octyl dichlorosilane, $CH_3(C_8H_{17})SiCl_2$ distilling at from 115° to 117° C. at 20 millimeters, and having a specific gravity, $d_{20}^{20}$, of 0.984

Another fraction, distilling at 109° to 110° C. at 20 millimeters and having a specific gravity, $d_{20}^{20}$, of 0.992 apparently is methyl 2-octyl dichlorosilane, $CH_3(C_8H_{17})SiCl_2$

Analysis of the two fractions gave the following results:

| Fraction | Percent silicon | Percent chlorine |
|---|---|---|
| 115°–117° C./20 mm | 12.0 | 31.3 |
| 109°–110° C./20 mm | 11.8 | 31.0 |
| Theory for $CH_3(C_8H_{17})SiCl_2$ | 12.3 | 31.3 |

A minor amount of methyltrichlorosilane was also produced.

Example 7

By procedure similar to that described in preceding examples, octadecene was reacted with methyl dichlorosilane, and the products collected and purified as before. Methyl octadecyl dichlorosilane, $CH_3(C_{18}H_{37})SiCl_2$, B. P. 185° C. at 2.5 millimeters pressure, was obtained. It is a colorless liquid having a specific gravity, $d_{20}^{20}$, of 0.930

Example 8

By procedure similar to that described in preceding examples diethyl chlorosilane $(C_2H_5)_2HSiCl$ and propylene were reacted to produce diethyl propyl chlorosilane, $(C_2H_5)_2C_3H_7SiCl$, distilling at from 164° to 165° C., at 742 millimeters pressure.

Example 9

A mixture of 3 gram mols each of ethylene and of methyldichlorosilane were placed in a bomb of 2.4 liter capacity and heated for 8 hours at a temperature of 269° C. From the reaction product which was discharged after the heating period, there was obtained by distillation a yield of 157.9 grams of methylethyldichlorosilane. No methyltrichlorosilane was produced. This run was repeated at temperatures of 330°, 365°, 406° and 448° C. The following yields were obtained:

| Temp., ° C. | Grams $CH_3C_2H_5SiCl_2$ | Grams $CH_3SiCl_3$ | Gram ratio $\frac{CH_3C_2H_5SiCl_2}{CH_3SiCl_3}$ |
|---|---|---|---|
| 269 | 157.9 | Nil | Inf. |
| 330 | 234.8 | Nil | Inf. |
| 365 | 195.9 | 22.2 | 8.8 |
| 406 | 193.7 | 59.7 | 3.2 |
| 448 | 185.0 | 111.2 | 1.7 |

Operating in a manner similar to that described in the examples given above, propylene may be reacted with methyl dibromosilane to form methyl propyl dibromosilane; ethyl dichlorosilane and propylene may be reacted to yield ethyl propyl dichlorosilane; diphenylchlorosilane and propylene may be reacted to produce diphenyl propyl chlorosilane, methyl dibromosilane and dodecane may be reacted to give methyl dodecyl dibromosilane; ethyl dichlorosilane may be reacted with octadecene to produce ethyl octadecyl dichlorosilane, etc.

That which we claim is:

1. The process which comprises reacting an olefin, in the absence of catalysts for effecting polymerization of olefins and at a temperature of less than 410° C. with a hydrocarbon-halosilane having both hydrogen and halogen atoms and at least one monovalent hydrocarbon radical, free of aliphatic unsaturation attached to the silicon atom to form a polyorganohalosilane as the principal reaction product.

2. The process which comprises reacting an olefin, in the absence of catalysts for effecting polymerization of olefins and at a temperature between 200° and 410° C. with a hydrocarbon-halosilane having both hydrogen and halogen atoms and at least one monovalent hydrocarbon radical, free of aliphatic unsaturation attached to the silicon atom to form a polyorganohalosilane as the principal reaction product.

3. The process which comprises reacting an olefin, in the absence of catalysts for effecting polymerization of olefins and at a temperature of less than 410° C. and at a pressure of at least 100 pounds per square inch, with a hydrocarbon-halosilane having both hydrogen and halogen atoms and at least one monovalent hydrocarbon radical, free of aliphatic unsaturation attached to the silicon atom to form a polyorganohalosilane as the principal reaction product.

4. The process for the preparation of a diorganodihalosilane which comprises reacting an olefin, in the absence of catalysts for effecting polymerization of olefins, with a monoorganodihalosilane of the general formula $RHSiCl_2$, wherein R represents a monovolent hydrocarbon radical free of aliphatic unsaturation, at a temperature below 410° C. and a pressure of at least 100 pounds per square inch.

5. The process in accordance with claim 1 in which the reactants are in liquid phase.

6. The process in accordance with claim 1 in which the silane is a monoalkyldichlorosilane.

7. The process in accordance with claim 1 in which the silane is phenyldichlorosilane.

8. The method of making organo silicon compounds which comprises heating an olefin, in the absence of catalysts for effecting polymerization of olefins, with a halosilane of the formula $RSiHCl_2$, wherein R represents lower alkyl, at an elevated temperature not above about 380° C. in a closed system.

9. The process in accordance with claim 1 in which the halogen atoms attached to silicon in the silane reactant are selected from the group consisting of chlorine and bromine atoms.

10. The process in accordance with claim 1 in which the silane reactant is methyldichlorosilane.

ARTHUR JOHN BARRY.
LEE DE PREE.
DONALD EUGENE HOOK.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1945 |
| 2,407,181 | Scott | Sept. 3, 1946 |
| 2,443,898 | Ellingboe | June 22, 1948 |

OTHER REFERENCES

Sommer et al., Jour. Am. Chem. Soc., vol. 69 (1947), p. 188.

Barry et al., Jour. Am. Chem. Soc., vol. 69 (1947), p. 2916.

Burkhard et al., Jour. Am. Chem. Soc., vol. 69 (1947), pp. 2687–89.

Pietrusza et al., Jour. Am. Chem. Soc., vol. 70 (1948), pp. 484–86.

Volnov, Jour. Gen. Chem., vol. 10 (1940), pp. 1600–04.